United States Patent
Tudor

(10) Patent No.: US 6,714,958 B1
(45) Date of Patent: Mar. 30, 2004

(54) DETECTING AND CAUSING LATENT DEADLOCKS IN MULTI-THREADED PROGRAMS

(75) Inventor: Curt D. Tudor, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/363,087

(22) Filed: Jul. 28, 1999

(51) Int. Cl.[7] .................................................. G06F 9/00
(52) U.S. Cl. ........................... 709/100; 709/107; 707/8; 710/200
(58) Field of Search .................. 709/107, 100; 707/8; 710/200

(56) References Cited

U.S. PATENT DOCUMENTS 5,515,538 A * 5/1996 Kleiman ..................... 710/260
6,223,204 B1 * 4/2001 Tucker ....................... 709/103

OTHER PUBLICATIONS

George Coulouris, "Distributed Systems Concept and Design" 1994, Dadison–Wesley, Second Edition, pp. 384 and 389.*

* cited by examiner

Primary Examiner—John Follansbee
Assistant Examiner—Phuong N. Hoang
(74) Attorney, Agent, or Firm—Ritter, Lang & Kaplan LLP

(57) ABSTRACT

Methods and systems for analyzing multi-threaded programs are provided. The predisposed execution of multi-threaded programs is modified to cause and detect latent deadlocks. When a thread attempts to acquire a synchronization object, it is determined if the synchronization object was previously held by a thread that subsequently acquired another synchronization object while still holding the first. If this occurred, the thread is suspended and may be awakened by a thread that has acquired the synchronization object. The newly awakened thread may then attempt to acquire a synchronization object that is held by the second thread thereby increasing the likelihood that a latent deadlock will be caused and detected.

17 Claims, 9 Drawing Sheets

DETECTING AND CAUSING LATENT DEADLOCKS IN MULTI-THREADED PROGRAMS

CROSS-REFERENCE TO RELATED APPLICATIONS

This application is related to U.S. patent application Ser. No. 09/128,394, filed Aug. 3, 1998, which is hereby incorporated by reference.

BACKGROUND OF THE INVENTION

The present invention relates to analyzing multi-threaded programs. More specifically, the invention relates to modifying the predisposed execution of a multi-threaded program to detect and cause latent deadlocks.

Traditional computer programs involved a single execution stream that performed operations sequentially. However, it is now common for computer programs to include multiple execution streams, which can perform operations in parallel. Each instruction stream is known as a "thread."

Multi-threaded programs allow for better utilization of the computer system's resources. For example, where a traditional single-threaded program awaits for user input and wastes processing power, a multi-thread program can have a thread perform operations in the "background" while a different thread is processing the user input. Thus, a multi-threaded word processing program can perform spell checking or a multi-threaded spreadsheet program can recalculate the spreadsheet in the background to achieve more efficient utilization of processing power.

Although multi-threaded programs can provide better utilization of the computer system's resources, the dynamic execution of threads makes debugging the programs very difficult. Errors in thread synchronization may be rarely manifested during program execution. This can make the synchronization errors hard to detect, hard to reproduce and hard to verify that an error has been corrected.

Deadlocks can occur when multiple threads compete for the same set of multiple synchronization objects but acquire them in different orders. When one thread acquires a synchronization object, it exposes other threads that might also contend for that same synchronization object to a potential deadlock. As long as the first thread retains ownership of the synchronization object, the contending threads will typically be suspended whenever they attempt to acquire that synchronization object. The thread that holds the synchronization object may attempt to acquire another synchronization object. If this synchronization object is held by one of the contending, suspended threads, a deadlock can occur.

In order to illustrate how a deadlock can be latent, FIG. 1 shows a simple illustration of two threads that acquire, hold, and release two synchronization objects. At an instruction 101, thread 1 acquires a synchronization object called "mu1." Subsequently, thread 1 acquires synchronization object "mu2" at an instruction 103. At instructions 105 and 107, thread 1 releases synchronization objects mu2 and mu1, respectively.

At some point in time later, thread 2 acquires synchronization object mu2 at an instruction 109. Thread 2 then acquires synchronization object mu1 at an instruction 111. At instructions 113 and 115, thread 2 releases synchronization objects mu1 and mu2, respectively.

It should be understood that FIG. 1 only includes instructions that acquire and release the two synchronization objects. Nevertheless, the Figure. Illustrates that both thread 1 and thread 2 were potentially contending for the synchronization objects mu1 and mu2, but the sequence of execution of the threads did not cause a deadlock condition.

FIG. 2 shows a simple illustration of how the two threads of FIG. 1 can become deadlocked. At an instruction 201, thread 1 acquires synchronization object mu1. Thread 2 then executes and acquires synchronization object mu2 at an instruction 203. At an instruction 205, thread 2 attempts to acquire synchronization object mu1. However, synchronization object mu1 is currently being held by thread 1. Therefore, thread 2 is not able to acquire synchronization object mu1 and is suspended awaiting the availability of the synchronization object at an instruction 207.

Thread 1 continues execution and attempts to acquire synchronization object mu2 at an instruction 209. Since synchronization object mu2 is held by thread 2, thread 1 is not able to acquire the synchronization object and is suspended awaiting the availability of synchronization mu2 at an instruction 211. At this point, deadlock has occurred since thread 2 is waiting for a synchronization object that thread 1 holds and thread 1 is waiting on a synchronization object that thread 2 holds.

As shown, in multi-threaded programs a deadlock can be latent and only surface if the right (or wrong) execution sequence occurs. It would be beneficial to have new techniques for detecting and causing latent deadlocks in a multi-threaded program. Additionally, it would be beneficial to have techniques that increase the opportunity for latent deadlocks to manifest themselves without introducing new deadlocks into the program.

SUMMARY OF THE INVENTION

Embodiments of the present invention provide methods and systems for analyzing multi-threaded programs. More specifically, the predisposed execution of multi-threaded programs is modified to cause and detect latent deadlocks. In general, synchronization objects are tracked and when a thread attempts to acquire a synchronization object that could result in a deadlock with another thread, the thread is suspended. When another thread attempts to acquire the synchronization object, the second thread is allowed to obtain the synchronization object and the first thread is awakened to potentially produce a deadlock.

In one embodiment, the invention provides a computer implemented method of analyzing multi-threaded programs. A request is received from a first thread that holds at least one synchronization object to acquire a synchronization object. It is determined if another thread previously held the synchronization object while acquiring another synchronization object. If another thread previously held the synchronization object while acquiring another synchronization object, the first thread is suspended. While the first thread is suspended, a request from a second thread to acquire the synchronization object is received. The second thread is allowed to acquire the synchronization object and the first thread is awakened thereby creating a potential deadlock.

Other features and advantages of the invention will become readily apparent upon review of the following description in association with the accompanying drawings.

DETAILED DESCRIPTION OF PREFERRED EMBODIMENTS

In the description that follows, the present invention will be described in reference to embodiments that analyze multi-threaded programs in order to detect latent deadlocks. More specifically, the embodiments will be described in reference to modifying an existing multi-threaded program to perform the analysis. However, the invention is not limited to any particular language, computer architecture or specific implementation. Therefore, the description of the embodiments that follows is for purposes of illustration and not limitation.

Figure 1:
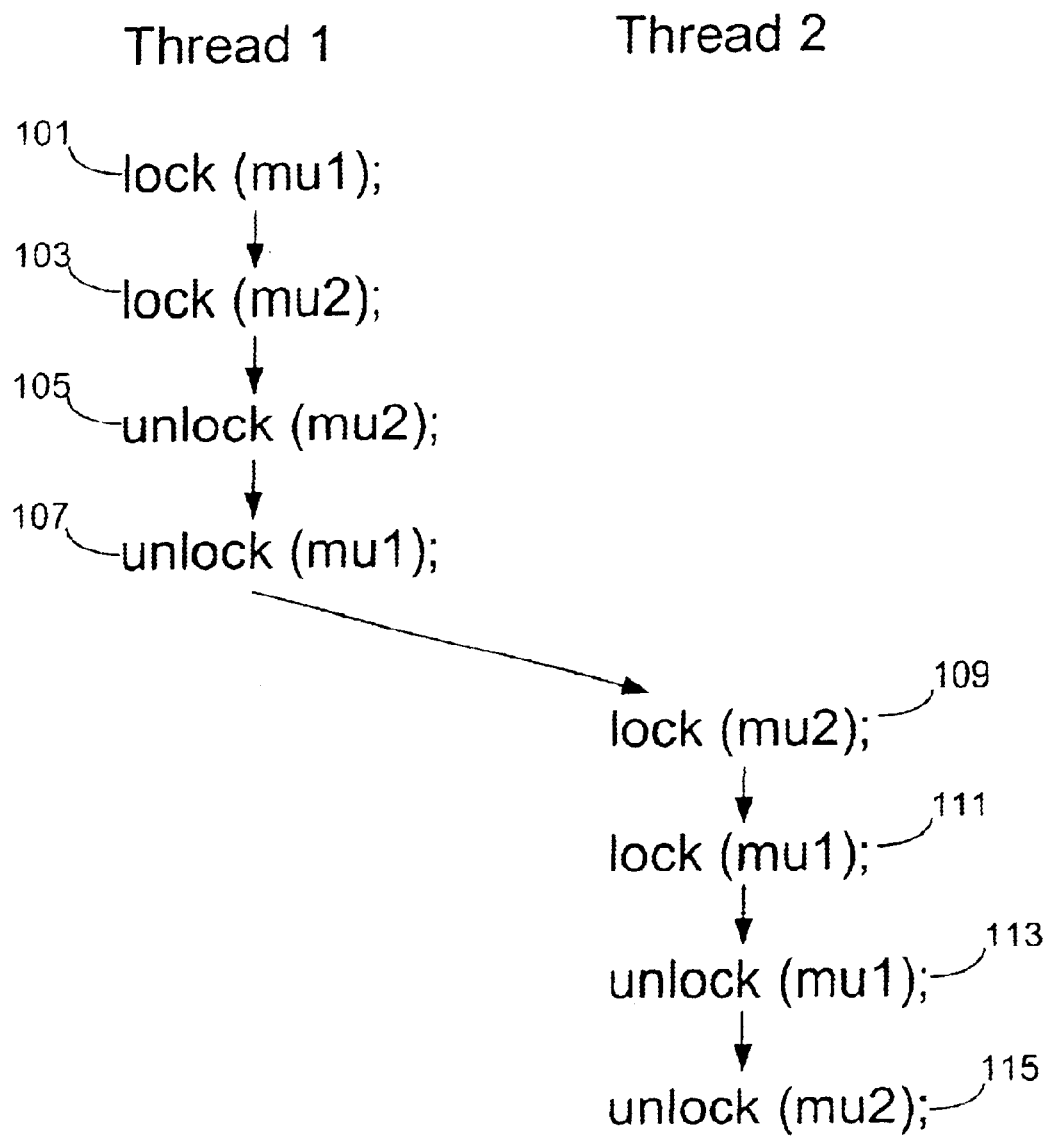
FIG. 1 illustrates two threads that contend for two synchronization objects without creating a deadlock.
Figure 2:
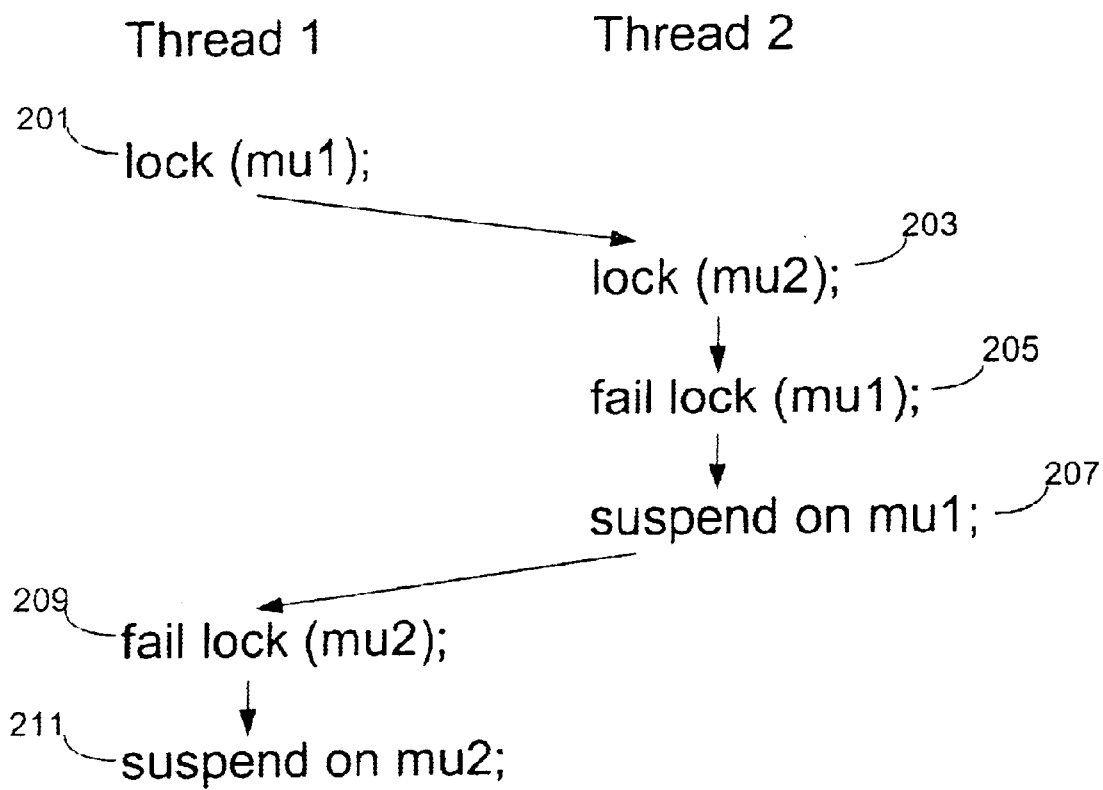
FIG. 2 illustrates the two threads of FIG. 1 executing in a manner to produce a deadlock.
Figure 3:
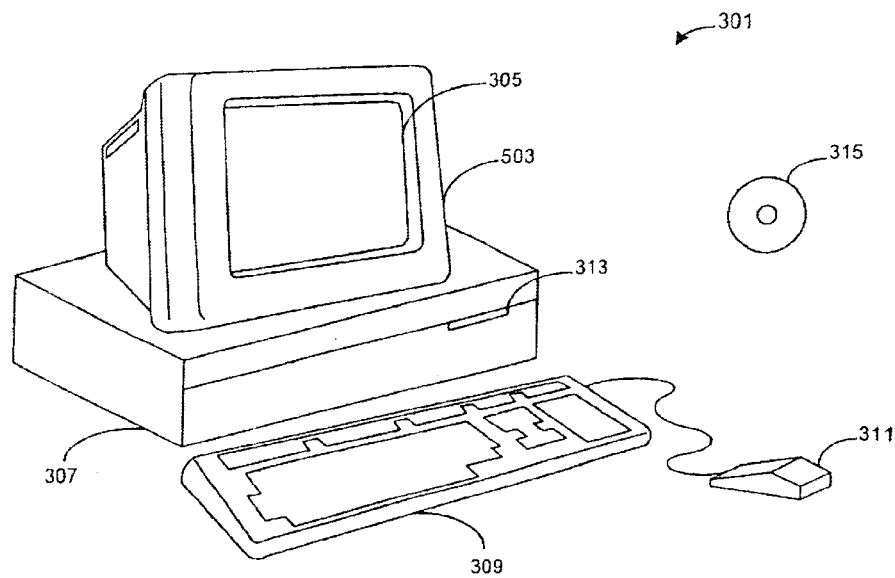
FIG. 3 illustrates an example of a computer system that can be utilized to execute the software of an embodiment of the invention.

FIG. 3 illustrates an example of a computer system that can be used to execute the software of an embodiment of the invention. FIG. 3 shows a computer system 301 that includes a display 303, screen 305, cabinet 307, keyboard 309, and mouse 311. Mouse 311 can have one or more buttons for interacting with a graphical user interface. Cabinet 307 houses a CD-ROM drive 313, system memory and a hard drive (see FIG. 4) which can be utilized to store and retrieve software programs incorporating computer code that implements the invention, data for use with the invention, and the like. Although CD-ROM 315 is shown as an exemplary computer readable storage medium, other computer readable storage media including floppy disk, tape, flash memory, system memory, and hard drive can be utilized. Additionally, a data signal embodied in a carrier wave (e.g., in a network including the Internet) can be the computer readable storage medium.

Figure 4:
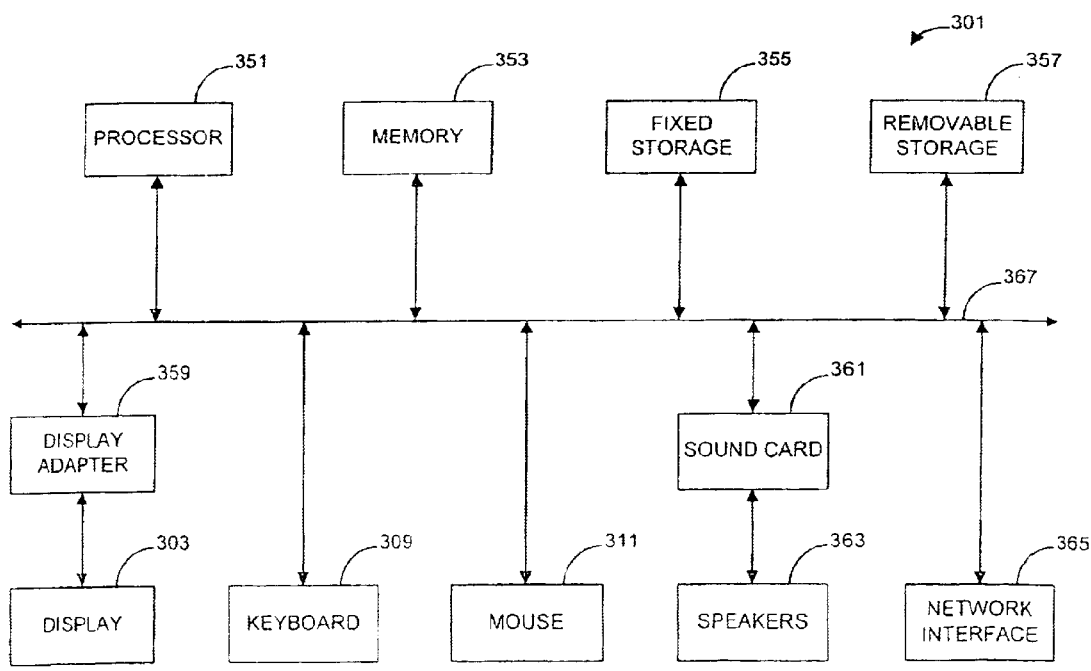
FIG. 4 illustrates a system block diagram of the computer system of FIG. 3.

FIG. 4 shows a system block diagram of computer system 301 used to execute the software of an embodiment of the invention. As in FIG. 3, computer system 301 includes monitor 303 and keyboard 309, and mouse 311. Computer system 301 further includes subsystems such as a central processor 351, system memory 353, fixed storage 355 (e.g., hard drive), removable storage 57 (e.g., CD-ROM drive), display adapter 359, sound card 361, speakers 363, and network interface 365. Other computer systems suitable for use with the invention can include additional or fewer subsystems. For example, another computer system could include more than one processor 351 (i.e., a multi-processor system) or a cache memory.

The system bus architecture of computer system 301 is represented by arrows 367. However, these arrows are illustrative of any interconnection scheme serving to link the subsystems. For example, a local bus could be utilized to connect the central processor to the system memory and display adapter. Computer system 301 shown in FIG. 4 is but an example of a computer system suitable for use with the invention. Other computer architectures having different configurations of subsystems can also be utilized.

Multi-threaded programs, just like single-threaded programs, are typically produced by linking object files to produce executable computer code. The object files can be produced by compiling high level source code (e.g., the C++ programming language) or low level source code (e.g., assembly). Additionally, multi-threaded programs can call object code functions stored as dynamic link libraries ("DLLs").

In order to analyze the execution of a multi-threaded program, preferred embodiments of the invention insert additional instructions in the object code of the program. Various techniques of object code insertion ("OCI") can be utilized with the invention including the techniques described in U.S. Pat. No. 5,193,180, issued Mar. 9, 1993, which is hereby incorporated by reference.

Utilizing OCI has a number of advantages. Since the object code is manipulated, it is not necessary to have access to the source code of a program. This can be especially advantageous for programs that utilize commercial libraries where the source code is generally unavailable. Additionally, OCI allows the analysis to be performed on any program regardless of the language that was used to develop the program. Although preferred embodiments utilize OCI, the invention is not limited to OCI and can be utilized where source code is modified and then compiled/assembled or in interpreted environments.

Figure 5A:
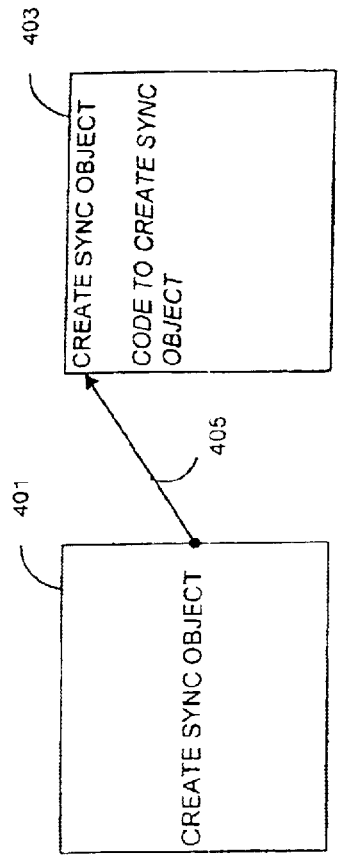
FIG. 5A shows a call to create a synchronization object and FIG. 5B shows how the call can be wrapped.

Before getting to the specifics of the invention, it may be beneficial to describe a technique known as "wrapping" a function. Wrapping a function allows the program flow to be intercepted so that additional and/or alternative instructions can be executed. As an example, FIG. 5A shows a call to create a synchronization object. An object code file 401 includes a call to a function that creates a synchronization object ("create sync object"), such as a lock. An object code file 403 includes the function that creates the synchronization object (or "sync object" for short).

In normal program flow, the computer system executes the instructions in object file 410 until the call to the function that creates a synchronization object is reached. The call typically causes the computer system to save the state of the machine and begin executing the instructions of the called function in object code file 403. The call is indicated by an arrow 405.

After the function that creates the synchronization object finishes execution, the state of the machine before the call is restored and execution resumes in object code file 401 after the function call. Although the function call and function have been described in terms of object code files, the executable code is typically in the form of an executable file. The mechanics of calling functions is well known in the art and is provided to show a reference for wrapping functions.

Figure 5B:
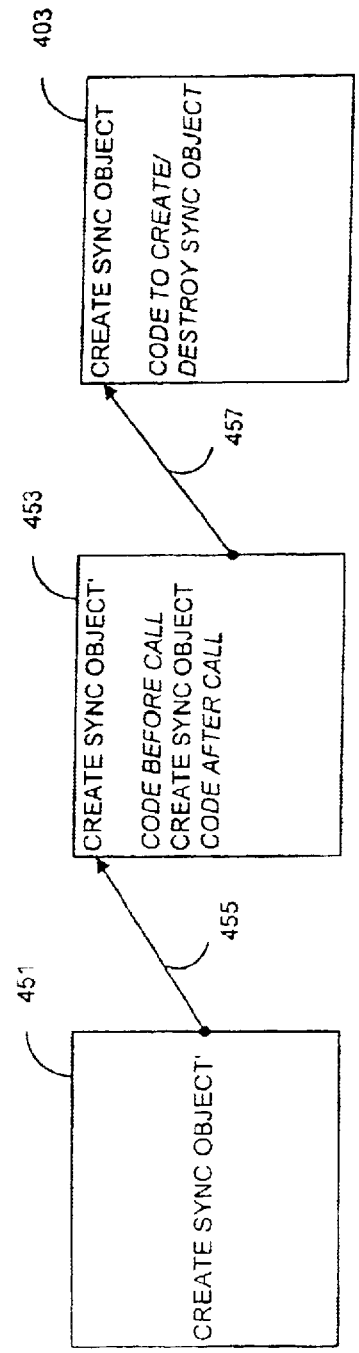

FIG. 5B shows how the call of FIG. 5A can be wrapped or intercepted. The function call to create a synchronization object in object code 401 ("create sync object") is modified in an object code file 451. Unless otherwise described, object code 451 includes the same instructions as object code 401. The different function call ("create sync object") in object code file 451 calls a function in an object code file 453 as indicated by an arrow 455.

The new function that creates a synchronization object in object code file 453 typically calls the function in object code 403 as indicated by an arrow 457. However, the function in object code file 453 can include instructions before and after the function call. In this manner, the function in object code file 403 can be wrapped with instructions that are executed before and/or after the function executes. Wrapping is also described in U.S. Pat. No. 5,193,180, which has been incorporated by reference.

Figure 6:
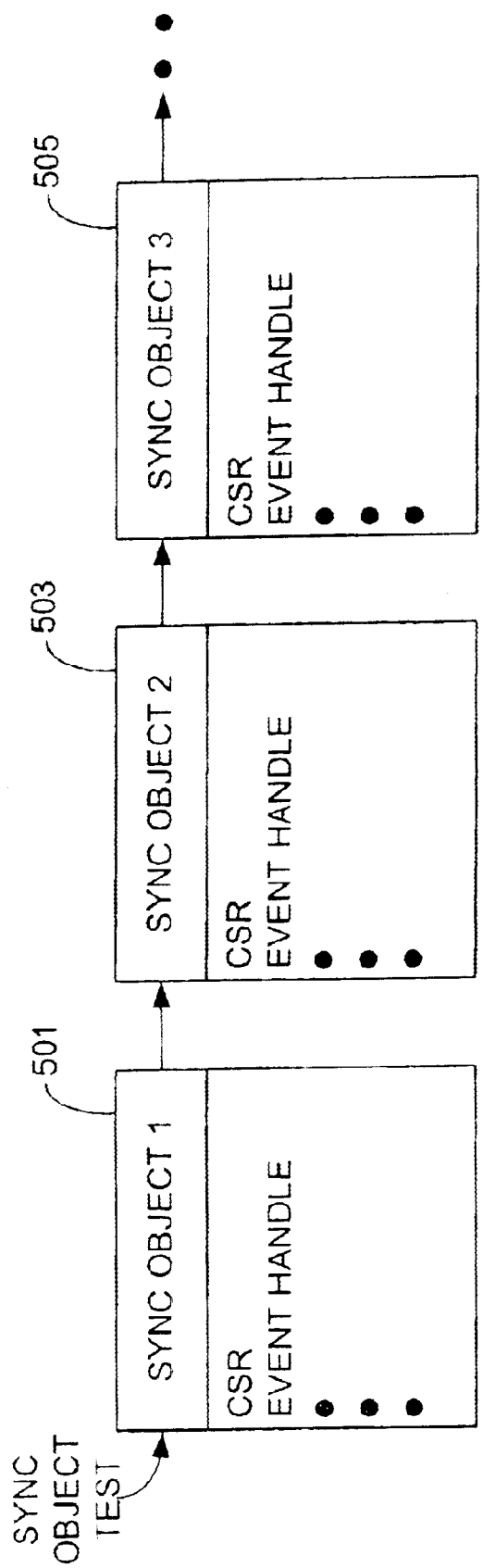
FIG. 6 shows a synchronization object list including information on synchronization objects utilized during execution of a multi-threaded program.

In order to track synchronization objects, embodiments of the invention can maintain a list of synchronization objects that are available during program execution. FIG. 6 shows a synchronization object list including synchronization object tracking elements 501, 503 and 505. Each synchronization object tracking element stores information about a synchronization object. The information about the synchronization objects is typically collected during program execution and can include various types of information including the threads that acquire the synchronization object, the duration that that synchronization object is held, the time the synchronization object was created, and the like. For simplicity, only the information that is most germane to the invention is shown in FIG. 6. More specifically, the synchronization object tracking elements are shown including a CSR flag, which stands for context switch randomization, and an event handle (or deadlock agent event handle). These variables will be discussed in more detail in the following paragraphs.

In order to maintain the synchronization object list shown in FIG. 6, the functions that create, destroy and manipulate synchronization objects are wrapped so that the list can be maintained. Therefore, when a synchronization object is created, a synchronization object element is added to the list. When a synchronization object is manipulated (e.g., acquired and released), the information in the synchronization object tracking element is updated. If a synchronization object is destroyed, the synchronization object tracking element can also be removed from the synchronization object list.

Figure 7:
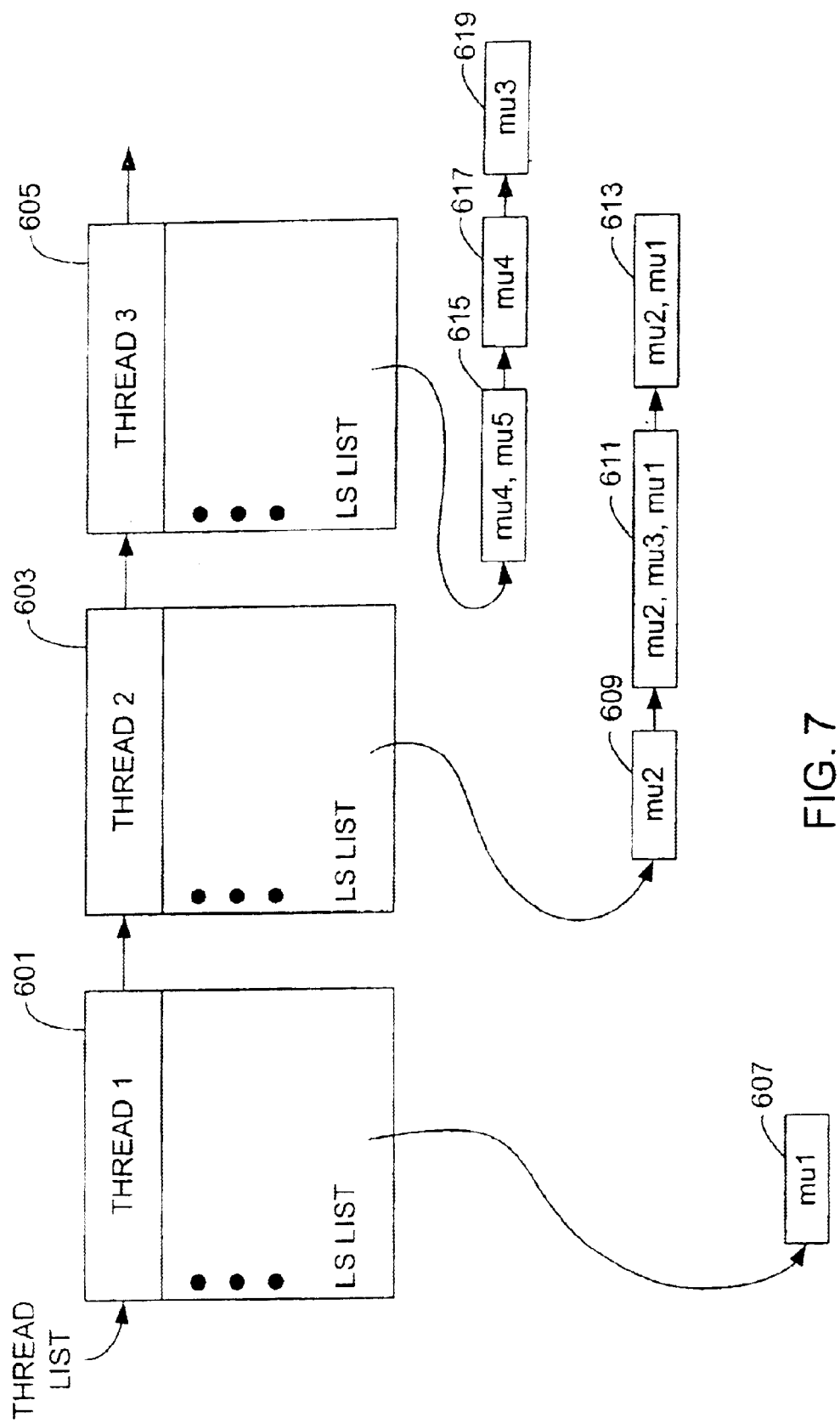
FIG. 7 shows a thread list that includes information on threads that execute during the multi-threaded program.

Another list that can be maintained is a thread list as shown in FIG. 7. The thread list includes thread elements 601, 603 and 605 that include information on the threads that execute within the program. Each thread element can store various types of information regarding the threads but the information that is most germane to the invention is a lock set list that stores the lock sets that have been acquired by each thread.

In general, the term "lock set" is a misnomer when dealing with deadlocks because the order in which the synchronization objects were acquired is important (i.e., with traditional sets order does not matter). The thread elements of FIG. 7 are shown with lock set lists that include sample data. More specifically, the lock set list of thread elements 601 includes a lock set 607. The lock set list of thread element 603 includes lock set 609, 611 and 613. Lastly, the lock set list of thread element 605 includes lock sets 615, 617 and 619.

The lock sets of FIG. 7 show the lock sets in the order in which they were acquired. For example, lock set 611 shows that thread 2 acquired synchronization object mu2, then acquired synchronization object mu3 and then acquired synchronization object mu1. In a preferred embodiment, the first lock set in the list is the current lock set being held by the thread. However, the current lock set can also be stored separately.

In general, there are four conditions that are required for a deadlock to occur, first, a thread must have acquired one lock and must be attempting to acquire a lock currently held by another thread. Second, the synchronization objects must be mutexes, which stands for mutual exclusion. In other words, synchronization objects can only be acquired by one thread at a time such that threads are not allowed to hold the same synchronization object. Third, a synchronization object that is held by a thread will not be taken from the thread (e.g., by the operating system) such that the thread can only lose a synchronization object by releasing it. Lastly, one thread has to be waiting on a synchronization object being held by another thread while that thread is waiting on a synchronization object being held by the first thread. It should be noted that a deadlock can occur among three or more threads by an extension of these principles.

Without the above four conditions, a deadlock will not occur. Some conditions can be guaranteed by the operating system and others can result by the programming of the multi-threaded program.

During execution, a thread's lock set is maintained. Threads that currently own one or more synchronization objects and that are attempting to acquire another synchronization object may be eligible for context switch randomization. Context switch randomization (CSR) is a collection of techniques used to cause threads to voluntarily or involuntarily relinquish the remainder of their dispatching quantum. Context switch randomization can generate thread dispatching patterns that are radically different from those experienced by the same program when it is unmonitored. If the synchronization object the thread is attempting to acquire has been accessed by other threads in the past and the other threads had subsequently acquired other synchronization objects while this synchronization object was held, then this acquisition attempt is eligible for context switch randomization.

In this case, the thread is caused to suspend prior to acquisition until another thread attempts to acquire the same synchronization object or a suspend time limit is reached. If another thread does attempt to acquire the same synchronization object the first thread is suspended on before the suspend time limit is reached, the suspended thread is resumed. If another thread does not attempt to acquire the same synchronization object the first thread is suspended on, the second thread is granted ownership of the synchronization object and then the first thread is resumed. The resumed thread will immediately block on the acquisition attempt since the synchronization object is now owned by another thread. The thread that was granted ownership of the synchronization object may now proceed and may attempt to acquire a synchronization object owned by the first thread, thereby resulting in deadlock.

Figure 8A:
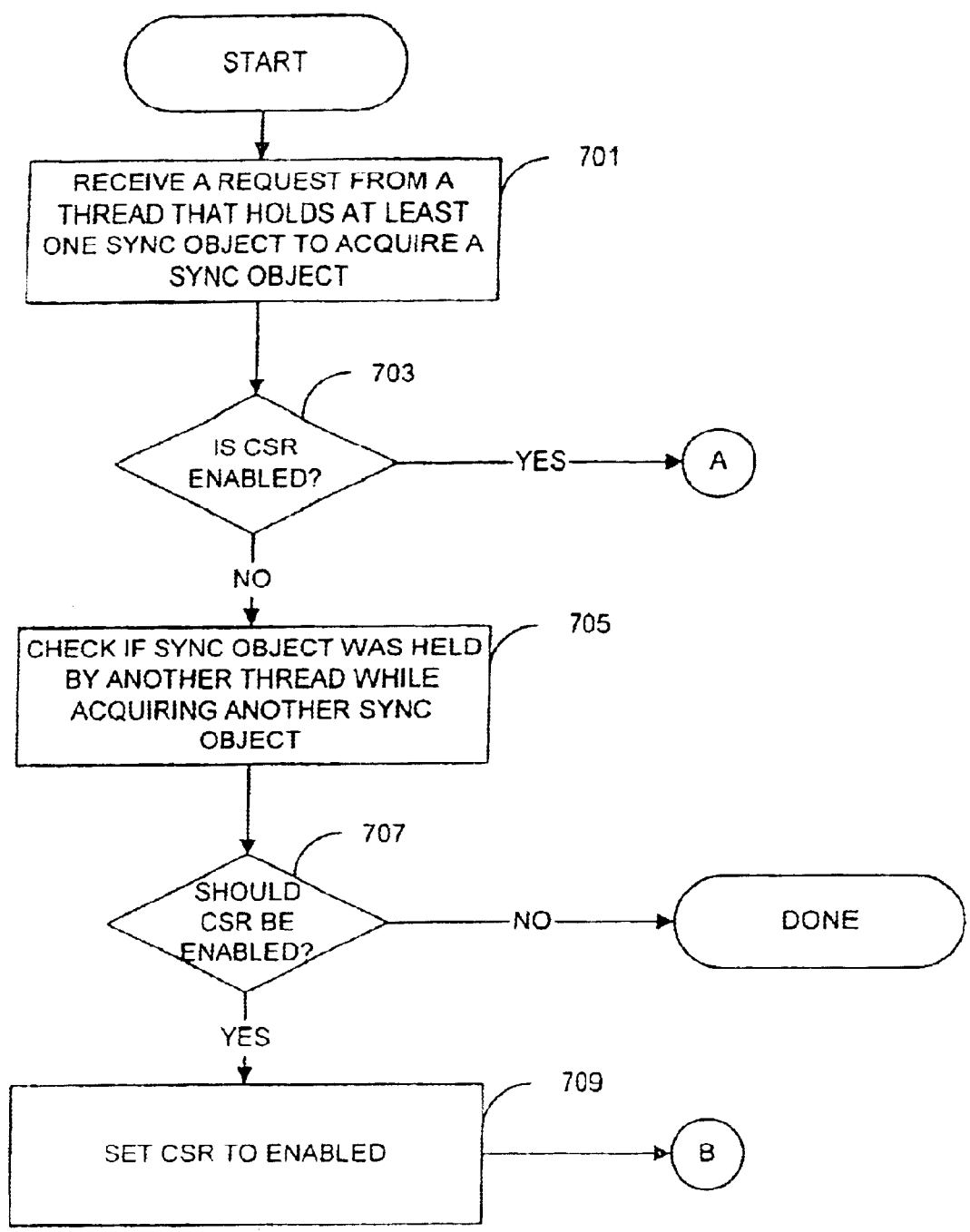
FIGS. 8A–8C show a flow chart of a process of causing and detecting latent deadlocks in a multi-threaded program.
Figure 8B:
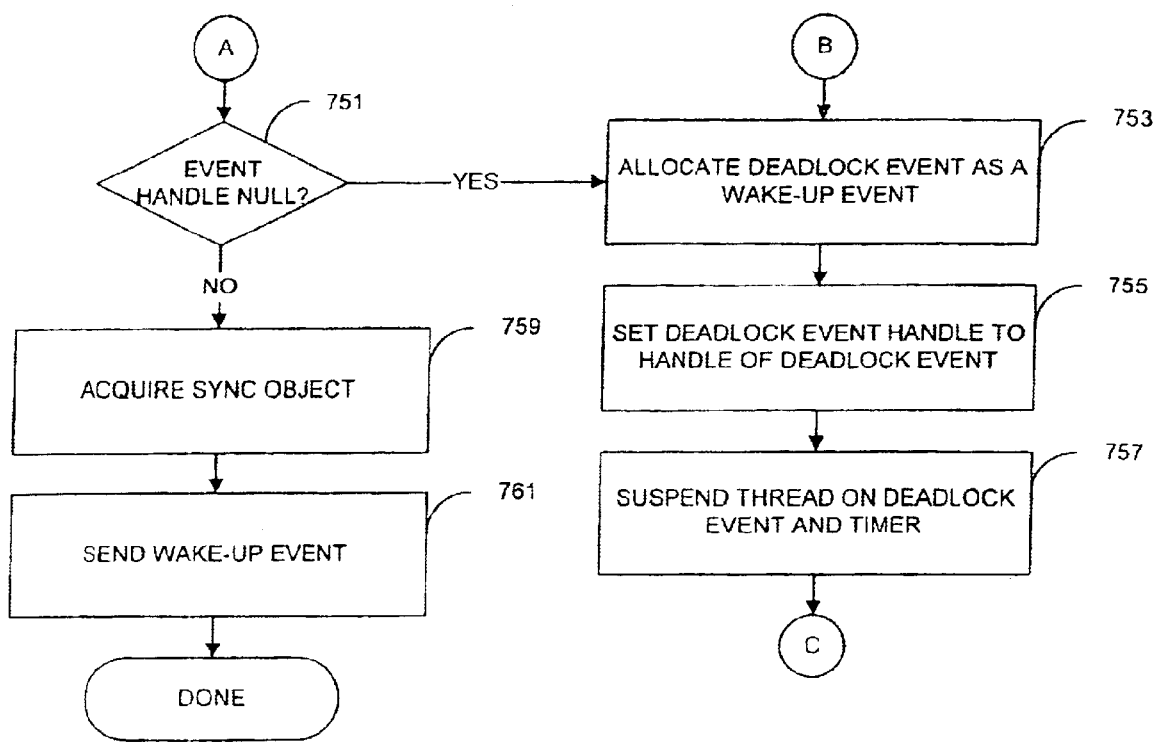
Figure 8C:
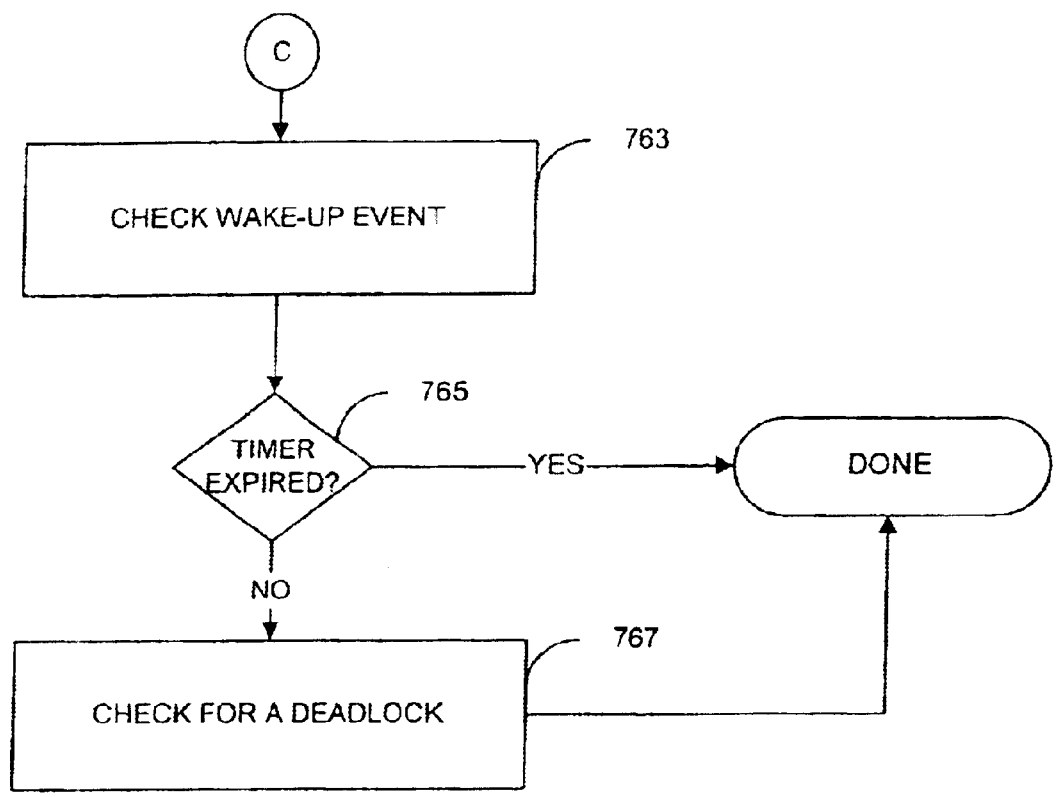

FIGS. 8A–8C show a flow chart of a process of causing and detecting deadlocks. At a step 701, a request is received from a thread that holds at least one synchronization object to acquire a synchronization object. In other words, the thread already holds a synchronization object and is attempting to acquire a second or subsequent synchronization object. The synchronization object tracking element of the synchronization object that is to be acquired is examined. At a step 703, it is determined if the CSR flag or bit is enabled. The CSR flag is enabled to indicate that the synchronization object is eligible for context switch randomization. As will be seen in the flow chart, the synchronization object becomes eligible for a context switch randomization when the thread has been held by another thread in the past and the other thread had subsequently acquired a synchronization object while this synchronization object was held.

If the synchronization object is not CSR enabled, it is determined if the synchronization object should be CSR enabled at a step 705. The synchronization object should be CSR enabled if the synchronization object was held by another thread while acquiring another synchronization object. If the synchronization object should be CSR enabled at a step 707, the CSR flag is set to enabled at a step 709.

Continuing to FIG. 8B, if the CSR flag is enabled, the event handle in the synchronization object tracking element is accessed to see if it is NULL at a step 751. The event handle is the handle for an event that will be signaled if a deadlock is possible as will be seen as follows. The event handle will always be NULL for those synchronization objects that are not CSR enabled. For synchronization objects that are CSR enabled, the event handle can possibly be non-NULL. It will be non-NULL when a thread is suspended on an acquisition attempt for the synchronization object.

If the event handle is NULL at step 751 (or the CSR flag is enabled at step 709 of FIG. 8A), a deadlock event is allocated as a wake-up event at a step 753. Operating systems typically have a mechanism for requesting an event handle that can be utilized between threads. An event is requested and a handle will be utilized to awaken this thread after it is suspended.

At a step 755, the deadlock event handle in the synchronization object tracking element is set to the allocated handle. The thread is then suspended on the deadlock event and a timer at a step 757. The current thread is suspended and will awaken if the deadlock event message is received, thereby awakening the thread, or if a predetermined amount of time expires, which also sends a message to the thread to awaken. Thus, the thread can be awakened two different ways. The execution flow of the thread after it awakens will be described in reference to FIG. 8C, but it may be beneficial to show how it can be awakened by another thread.

A subsequent thread can determine that the event handle is not NULL at step 751. This means that a previous thread that attempted to acquire the synchronization object is suspended. As the previous thread was suspended before it acquired the synchronization object, the synchronization object should be available and is acquired by the current thread at a step 759. The current thread, i.e., the one that is not suspended and acquired the synchronization object, sends the wake-up event utilizing the deadlock agent event handle in the synchronization object tracking element at a step 761. The current thread will then continue execution and potentially attempt to acquire a synchronization object that is held by the newly awaked thread. Thus, a latent deadlock has been caused.

FIG. 8C shows a process a newly awakened thread can perform upon awakening. At a step 763, the wake-up event is checked. If the wake-up event is determined to be that the timer expired at a step 765, the thread continues execution. This means that although the thread was suspended and a deadlock was possible, it did not occur during the predetermined time of the timer. The time can be lengthened (or shortened) to create a greater (lesser) chance of causing a deadlock condition.

If the wake-up is event determined not to be the time limit expiring, the thread was awakened by another thread that acquired the synchronization object this thread was attempting to acquire. At a step 767, the threads continue execution and checks are made to determine if a deadlock occurs. The mechanisms for suspending threads, allocating and sending events, setting timers, and awakening threads are typically dependent on the operating system that is being utilized. If a deadlock occurs, the threads that deadlocked and the synchronization objects that caused the deadlock can be displayed on the screen for a user to analyze. With the invention, the probability that a latent deadlock will occur can be substantially increased. This allows a user to more easily find latent deadlocks and analyze details on what caused the deadlocks so that the user can remedy the problems.

As an example, referring back to FIG. 7. Thread 1 is shown as currently holding lock set 607 including synchronization object mu1. Assuming for the moment thread 1 attempts to acquire synchronization object mu3, the lock set lists of the other threads may be analyzed to determine if synchronization object mu3 was held by a thread and the thread subsequently acquired another synchronization object while still holding synchronization object mu3.

Although thread 3 held synchronization object mu3 in lock set 619, thread 3 did not subsequently acquire another synchronization object before mu3 was released. However, thread 2 acquired synchronization object mu3 in lock set 611. Subsequently, thread 2 acquired synchronization object mu5 in lock set 611 while still holding synchronization object mu3. Accordingly, synchronization object mu3 is eligible for context switch randomization and the CSR flag will be enabled in the synchronization object tracking element shown in FIG. 6.

Now, continuing with this example, thread 1 is suspended before acquiring synchronization object mu3. While thread 1 is suspended, thread 2 attempts to acquire synchronization object mu3. Synchronization object mu3 is available so it is acquired by thread 2 and it awakens thread 1. Thread 1 cannot acquire synchronization object mu3 now since it is unavailable so thread 1 gets suspended awaiting on synchronization object mu3. If thread 2 then tries to acquire synchronization object mu1 that is held by thread 1, a deadlock condition can occur.

While the above is a complete description of preferred embodiments of the invention, various alternatives, modifications, and equivalents can be used. It should be evident that the invention is equally applicable by making appropriate modifications to the embodiments described above. Therefore, the above description should not be taken as limiting the scope of the invention that is defined by the metes and bounds of the appended claims along with their full scope of equivalents.

What is claimed is:

1. A computer implemented method of analyzing multi-threaded programs, comprising:

receiving a request from a first thread that holds at least one synchronization object to acquire a synchronization object;

determining if another thread previously held the synchronization object while acquiring another synchronization object;

suspending the first thread if another thread previously held the synchronization object while acquiring another synchronization object;

receiving a request from a second thread to acquire the synchronization object while the first thread is suspended;

allowing the second thread to acquire the synchronization object; and awakening the first thread.

2. The method of claim 1, further comprising checking whether the first and second thread are deadlocked by the first thread waiting to acquire a synchronization object that the second thread holds and the second thread waiting to acquire a synchronization object that the first thread holds.

3. The method of claim 1, wherein the first thread is suspended for a predetermined time, meaning that the first thread awakens after the predetermined time expires.

4. The method of claim 3, wherein the thread is also suspended on an event, meaning that the event awakens the first thread.

5. The method of claim 4, wherein the second thread sends the event that awakens the first thread.

6. The method of claim 1, wherein the first and second threads can hold a plurality of synchronization objects at a time.

7. The method of claim 1, wherein only one thread can hold the synchronization object at a time.

8. The method of claim 1, wherein only the first and second threads can release synchronization objects that each holds.

9. A computer program product for analyzing multi-threaded programs, comprising:
   computer code that receives a request from a first thread that holds at least one synchronization object to acquire a synchronization object;
   computer code that determines if another thread previously held the synchronization object while acquiring another synchronization object;
   computer code that suspends the first thread if another thread previously held the synchronization object while acquiring another synchronization object;
   computer code that receives a request from a second thread to acquire the synchronization object while the first thread is suspended;
   computer code that allows the second thread to acquire the synchronization object;
   computer code that awakens the first thread; and
   a computer readable medium that stores the computer codes.

10. The computer program product of claim 9, wherein the computer readable medium is selected from the group consisting of CD-ROM, floppy disk, tape, flash memory, system memory, hard drive, and data signal embodied in a carrier wave.

11. The computer program product of claim 9, further comprising computer code that checks whether the first and second thread are deadlocked by the first thread waiting to acquire a synchronization object that the second thread holds and the second thread waiting to acquire a synchronization object that the first thread holds.

12. The computer program product of claim 9, wherein the first thread is suspended for a predetermined time, meaning that the first thread awakens after the predetermined time expires.

13. The computer program product of claim 12, wherein the thread is also suspended on an event, meaning that the event awakens the first thread.

14. The computer program product of claim 13, wherein the second thread sends the event that awakens the first thread.

15. The computer program product of claim 9, wherein the first and second threads can hold a plurality of synchronization objects at a time.

16. The computer program product of claim 9, wherein only one thread can hold the synchronization object at a time.

17. The computer program product of claim 9, wherein only the first and second threads can release synchronization objects that each holds.

* * * * *